United States Patent
Chan et al.

(10) Patent No.: US 8,461,246 B2
(45) Date of Patent: Jun. 11, 2013

(54) MIXTURE OF CONJUGATED DIENE—VINYL AROMATIC HYDROCARBON COPOLYMERS AND ADHESIVE COMPOSITION HAVING THE SAME

(75) Inventors: Kung-Hsi Chan, Kaohsiung (TW); Tsung Hsin Chen, Kaohsiung (TW); Tai Wen Chiu, Qishan Township (TW)

(73) Assignee: TSRC Corporation, Taipei (TW)

( * ) Notice: Subject to any disclaimer, the term of this patent is extended or adjusted under 35 U.S.C. 154(b) by 0 days.

(21) Appl. No.: 12/769,175

(22) Filed: Apr. 28, 2010

(65) Prior Publication Data

US 2011/0152436 A1  Jun. 23, 2011

(30) Foreign Application Priority Data

Dec. 17, 2009  (TW) ................. 98143321 A

(51) Int. Cl.
*C08F 297/04* (2006.01)
*C08L 53/02* (2006.01)
*C09J 11/08* (2006.01)
*C09J 153/02* (2006.01)

(52) U.S. Cl.
USPC ........... 524/474; 524/484; 524/486; 524/505; 525/89

(58) Field of Classification Search
USPC .............. 525/89; 524/474, 484, 486, 505
See application file for complete search history.

(56) References Cited

U.S. PATENT DOCUMENTS

| | | | |
|---|---|---|---|
| 5,089,550 A | | 2/1992 | Sakagami et al. |
| 5,112,889 A | | 5/1992 | Miller et al. |
| 5,420,203 A | | 5/1995 | Dillman et al. |
| 5,453,319 A | * | 9/1995 | Gobran ............... 428/355 BL |
| 5,510,423 A | | 4/1996 | Van Dijk et al. |
| H1597 H | * | 9/1996 | Erickson ................. 522/158 |
| 5,705,569 A | * | 1/1998 | Moczygemba et al. ...... 525/314 |
| 5,719,226 A | | 2/1998 | Kegley |
| 6,183,862 B1 | * | 2/2001 | Ko et al. ................ 428/354 |
| 2005/0020773 A1 | * | 1/2005 | Lechat et al. ................ 525/89 |
| 2007/0054118 A1 | * | 3/2007 | Tabata et al. ............ 428/355 R |

FOREIGN PATENT DOCUMENTS

| | | |
|---|---|---|
| WO | 99/20709 | 4/1999 |
| WO | 2010/012906 | 2/2010 |

OTHER PUBLICATIONS

Kotaka, "Summing Up the Past Toward the Future," Reports on Progress in Polymer Physics in Japan, vol. 39, pp. 41-68 (Jan. 1996).
Pattuelli et al., "Sequence Distribution of Styrene-Butadiene Copolymers by Ozonolysis, High-Performance Liquid Chromataographic and Gas Chromataographic-Mass Spectrometric Techniques," Journal of Chromatography, vol. 665, No. 1, pp. 117-123 (Apr. 1994).
Watanbe et al., "Rheology of Ternary Mixtures of Styrene-Butadiene Diblock Copolymer, Homopolybutadiene, and n-Tetradecane," Journal of Rheology, vol. 27, No. 3, pp. 223-240 (Jan. 1983).

* cited by examiner

*Primary Examiner* — Jeffrey Mullis
(74) *Attorney, Agent, or Firm* — Volpe and Koenig, P.C.

(57) ABSTRACT

The present invention provides a mixture of conjugated diene-vinyl aromatic hydrocarbon copolymers and an adhesive having the same. The mixture of conjugated diene-vinyl aromatic hydrocarbon copolymers comprises 10 to 45 wt. % of a conjugated diene-vinyl aromatic hydrocarbon di-block copolymer, 10 to 45 wt. % of a conjugated diene-vinyl aromatic hydrocarbon tapered di-block copolymer and 10 to 80 wt. % of a conjugated diene-vinyl aromatic multi-block copolymer.

20 Claims, No Drawings

MIXTURE OF CONJUGATED DIENE—VINYL AROMATIC HYDROCARBON COPOLYMERS AND ADHESIVE COMPOSITION HAVING THE SAME

CROSS REFERENCE TO RELATED APPLICATIONS

This application claims the right of priority based on Taiwan Patent Application No. 98143321 entitled "MIXTURE OF CONJUGATED DIENE-VINYL AROMATIC HYDROCARBON COPOLYMERS AND ADHESIVE COMPOSITION HAVING THE SAME" filed on Dec. 17, 2009, which is incorporated herein by reference and assigned to the assignee herein.

FIELD OF THE INVENTION

This invention relates to a mixture of conjugated diene-vinyl aromatic hydrocarbon copolymers and an adhesive composition having the same, and more particularly, relates to a mixture of conjugated diene-vinyl aromatic hydrocarbon copolymers with improved elongation property, and an adhesive composition for preparing adhesives with improved properties of initial tack, peel strength and holding power.

BACKGROUND OF THE INVENTION

In industries, conjugated diene-vinyl aromatic hydrocarbon block copolymers are usually utilized as major materials for adhesive compositions, and such adhesive compositions can be applied in, for example, tapes, labels and disposable soft articles such as diapers, feminine napkins, surgical dressings and the like for adhesion purposes.

U.S. Pat. No. 5,089,550 discloses a block copolymer composition, which comprises 50 to 85 wt. % of a conjugated diene-vinyl aromatic hydrocarbon di-block copolymer, and 15 to 50 wt. % of a vinyl aromatic hydrocarbon-conjugated diene-vinyl aromatic hydrocarbon tri-block copolymer. This block copolymer composition can be used for adhesive compositions.

U.S. Pat. No. 5,112,889 discloses a pressure-sensitive adhesive, which comprises an A-B-A block copolymer or an AB block copolymer in geometry of such as a tapered block copolymer or a radial block copolymer, wherein the A blocks are derived from styrene or alphamethylstyrene and the B blocks are derived from isoprene, butadiene, or the hydrogenated thereof.

U.S. Pat. No. 5,420,203 discloses a process for producing block copolymer compositions, which comprises anionically polymerizing at least one vinyl aromatic hydrocarbon and at least one conjugated diene to form a living block copolymer, coupling the living block copolymer by adding a coupling agent, and then decoupling the coupled block copolymer by heating.

U.S. Pat. No. 5,510,423 discloses a conjugated diene-vinyl aromatic hydrocarbon linear block copolymer A-B-C-D, wherein A and D represent predominantly vinyl aromatic hydrocarbon polymer blocks, B represents a predominantly conjugated diene polymer block, and C represents a tapered block of the conjugated diene present in the block B and the vinyl aromatic hydrocarbon present in the block D. In the tapered block of C, the number of the vinyl aromatic hydrocarbon gradually increases toward the block D. This linear block copolymer can be used in adhesive compositions.

U.S. Pat. No. 5,719,226 discloses a hot melt adhesive composition with low viscosity. The hot melt adhesive composition comprises a blend consisting of an unhydrogenated or hydrogenated styrene-diene tri-block copolymer, and an unhydrogenated styrene-isoprene di-block copolymer.

The afore-mentioned U.S. patents disclose adhesive compositions having block copolymers in various ingredients. The adhesive compositions can be formed with various properties in order to fit requirements for different applications. Normally for the adhesive applications, properties of initial tack, peel strength and holding power properties are very important. Therefore, when developing the application of adhesives, there is a need to provide an adhesive composition with improved properties of initial tack, peel strength and holding power.

SUMMARY OF THE INVENTION

One object of the present invention is to provide a mixture of conjugated diene-vinyl aromatic hydrocarbon copolymers with improved elongation property. The mixture of conjugated diene-vinyl aromatic hydrocarbon copolymers can be used for plastic modification and adhesive properties improvement.

Another object of the present invention is to provide an adhesive composition for preparing adhesives with improved properties of initial tack, peel strength and holding power. The adhesive composition is provided to enhance the added value of products having conjugated diene-vinyl aromatic hydrocarbon copolymer products, and also enlarge the application field of the conjugated diene-vinyl aromatic hydrocarbon copolymers.

To achieve above and other objects, one embodiment of the present invention provides a mixture of conjugated diene-vinyl aromatic hydrocarbon copolymers, which comprises 10 to 45 wt. % of a conjugated diene-vinyl aromatic hydrocarbon di-block copolymer, 10 to 45 wt. % of a conjugated diene-vinyl aromatic hydrocarbon tapered di-block copolymer and 10 to 80 wt. % of a conjugated diene-vinyl aromatic multi-block copolymer.

Another embodiment of the present invention provides an adhesive composition, which comprises 100 parts by weight of the mixture of conjugated diene-vinyl aromatic hydrocarbon copolymers, and 1 to 700 parts by weight of a tackifier.

The objects, features and advantages of the present invention may be best understood by reference to the detailed description thereinafter.

DETAILED DESCRIPTION OF THE INVENTION

The word "a" or "an" used in the context is not a limitation on numbers unless otherwise indicated.

One embodiment of the present invention provides a mixture of conjugated diene-vinyl aromatic hydrocarbon copolymers with improved elongation property, which can be used for plastic modification and adhesive properties improvement.

The mixture of conjugated diene-vinyl aromatic hydrocarbon copolymers according to the embodiment of the present invention comprises:

10 to 45 wt. % of a conjugated diene-vinyl aromatic hydrocarbon di-block copolymer;

10 to 45 wt. % of a conjugated diene-vinyl aromatic hydrocarbon tapered di-block copolymer; and 10 to 80 wt. % of a conjugated diene-vinyl aromatic multi-block copolymer.

The weight percentages of each the above block copolymers are based on the weight of the mixture of conjugated diene-vinyl aromatic hydrocarbon copolymers. In some cases, the mixture of conjugated diene-vinyl aromatic hydrocarbon copolymers may further comprise suitable additives to improve its properties. For example, a small amount of antioxidants can be added to facilitate preservation of the mixture.

The di-block copolymer, the tapered di-block copolymer and the multi-block copolymer are independently polymerized from conjugated diene monomers and vinyl aromatic hydrocarbon monomers. In the embodiment, the conjugated diene monomers can be selected, for example, from a group consisting of 1,3-butadiene, 2,3-dimethyl-1,3-butadiene, 3-butyl-1,3-octadiene, isoprene, trans-1,3-pentadiene, 2-phenyl-1,3-butadiene and combinations thereof. The vinyl aromatic hydrocarbon monomers can be selected, for example, from a group consisting of styrene, α-methyl styrene, p-ethyl styrene, cyclohexyl styrene, p-methyl styrene, o-methyl styrene, m-methyl styrene, 1-vinyl-5-hexyl naphthalene, vinyl naphthalene and combinations thereof. However, other conjugated diene monomers and vinyl aromatic hydrocarbon monomers can also be used in the present invention according to actual needs. In one preferred embodiment, the conjugated diene-vinyl aromatic hydrocarbon block copolymer is butadiene/styrene copolymer or isoprene/styrene copolymer, both of which are with higher industrial value.

The conjugated diene-vinyl aromatic hydrocarbon di-block copolymer is constituted of a conjugated diene polymer block and a vinyl aromatic hydrocarbon polymer block, wherein the conjugated diene polymer block is polymerized from conjugated diene monomers, and the vinyl aromatic hydrocarbon polymer block is polymerized from vinyl aromatic hydrocarbon monomers. In one embodiment, the conjugated diene-vinyl aromatic hydrocarbon di-block copolymer may have a weight-average molecular weight (Mw) of about $2 \times 10^4$ to $10 \times 10^4$ g/mol., preferably about $4 \times 10^4$ to $8 \times 10^4$ g/mol., and more about $5 \times 10^4$ to $7.5 \times 10^4$ g/mol. The conjugated diene-vinyl aromatic hydrocarbon di-block copolymer may have a vinyl aromatic hydrocarbon content of about 25 to 50 wt. %, preferably about 30 to 45 wt. %, and more preferably about 35 to 40 wt. %.

The conjugated diene-vinyl aromatic hydrocarbon tapered di-block copolymer is predominantly constituted of a polymer block and a tapered segment. In one embodiment, the polymer block of the conjugated diene-vinyl aromatic hydrocarbon tapered di-block copolymer is polymerized from vinyl aromatic hydrocarbon monomers, and the tapered segment is co-polymerized from conjugated diene monomers and vinyl aromatic hydrocarbon monomers. In another embodiment, the end portion of the tapered segment of the conjugated diene-vinyl aromatic hydrocarbon tapered di-block copolymer is preferably predominantly polymerized from the vinyl aromatic hydrocarbon monomers. In one embodiment, the conjugated diene-vinyl aromatic hydrocarbon tapered di-block copolymer may have a weight-average molecular weight of about $2 \times 10^4$ to $10 \times 10^4$ g/mol., preferably about $4 \times 10^4$ to $8 \times 10^4$ g/mol., and more about $5 \times 10^4$ to $7.5 \times 10^4$ g/mol. The conjugated diene-vinyl aromatic hydrocarbon tapered di-block copolymer may have a vinyl aromatic hydrocarbon content of about 25 to 55 wt. %, preferably about 30 to 50 wt. %, and more preferably about 35 to 45 wt. %.

The conjugated diene-vinyl aromatic multi-block copolymer is a copolymer constituted of three or more blocks from a conjugated diene polymer block and a vinyl aromatic hydrocarbon polymer block. In one embodiment, the conjugated diene-vinyl aromatic hydrocarbon multi-block copolymer may have a weight-average molecular weight of about $5 \times 10^4$ to $20 \times 10^4$ g/mol., preferably about $8 \times 10^4$ to $17 \times 10^4$ g/mol., and more about $10 \times 10^4$ to $15 \times 10^4$ g/mol. The conjugated diene-vinyl aromatic hydrocarbon multi-block copolymer may have a vinyl aromatic hydrocarbon content of about 25 to 50 wt. %, preferably about 30 to 45 wt. %, and more preferably about 35 to 40 wt. %.

The mixture of conjugated diene-vinyl aromatic hydrocarbon copolymers according to one embodiment of the present invention may have a weight-average molecular weight of about $2 \times 10^4$ to $20 \times 10^4$ g/mol.

In embodiments of the present invention, the weight-average molecular weight is measured by Waters Pump 515 Gel Permeation Chromatography (GPC) equipped with RI Detector—2414 and Shodex Column. For example, the weight-average molecular weight of a polymer can be measured by injecting 70 μl of a solution containing the polymer into the gel permeation chromatography. The solution is prepared by dissolving 0.02 grams of dried particles of the polymer in 10 ml of tetrahydrofuran (THF). The afore-mentioned "vinyl aromatic hydrocarbon content" is the percentage of the total weight of the vinyl aromatic hydrocarbon monomers for preparing a conjugated diene-vinyl aromatic hydrocarbon copolymer, based on the total weight of the monomers for forming the conjugated diene-vinyl aromatic hydrocarbon copolymer.

Regarding the conjugated diene-vinyl aromatic hydrocarbon copolymers according to the embodiment, the conjugated diene polymer blocks can be the same or different, and the vinyl aromatic hydrocarbon polymer blocks can be the same or different, wherein each conjugated diene polymer block can be formed by co-polymerizing any combination of conjugated diene monomers, and each vinyl aromatic hydrocarbon polymer block can be formed by co-polymerizing any combination of vinyl aromatic hydrocarbon monomers, according to industrial product property requirements.

In one embodiment, the mixture of conjugated diene-vinyl aromatic hydrocarbon copolymers can be formed by a solution blending method. According to the solution blending method, different polymer solutions of the conjugated diene-vinyl aromatic hydrocarbon copolymers are individually formed by polymerization reaction first. Then, the polymer solutions of the conjugated diene-vinyl aromatic hydrocarbon copolymers are blended in various proportions to form a blended polymer solution. Subsequently, a mixture of solid conjugated diene-vinyl aromatic hydrocarbon copolymers is obtained by solvent removal and drying of the blended polymer solution.

Solvents for polymerization reactions are preferably inert organic solvents, which may comprise, for example, aromatic hydrocarbons, linear or branched chain hydrocarbons, cycloalkyl ethers, alicyclic hydrocarbons, and so on. Examples of the aromatic hydrocarbons may include organic solvents such as benzene, toluene, xylene, ethyl benzene, and so on. Examples of the linear or branched chain hydrocarbons may include n-pentane, n-hexane, n-heptane, n-octane and the like. Examples of the cycloalkyl ethers may include, for example, tetrahydrofuran, and so on. Examples of the alicyclic hydrocarbons may include, for example, cyclopentane, cyclohexane, methyl cyclopentane, cycloheptane, methyl cycloheptane, and so on. Cyclohexane, n-hexane and n-heptane are preferred examples.

The conjugated diene-vinyl aromatic hydrocarbon di-block copolymer, the conjugated diene-vinyl aromatic hydrocarbon tapered di-block copolymer, and the conjugated diene-vinyl aromatic multi-block copolymer can be formed, for example, by an anionic polymerization method. In this method, organic lithium compounds can be used as catalyst initiators to obtain a living polymer with an anionic living group at one end of the molecular chain, such that the molecular chain can be lengthened by polymerization again after adding monomers thereto. Examples of the organic lithium compounds may comprise n-propyl lithium, isopropyl lithium, n-butyl lithium, sec-butyl lithium, tert-butyl lithium, n-pentyl lithium, phenyl lithium, tolyl lithium, dilithium hydrocarbon compounds, and so on. Examples of the dilithium hydrocarbon compounds may comprise, for example, 1,4-dilithium n-butane, 1,5-dilithium pentane, 1,2-dilithium-diphenyl ethane, 1,4-dilithium-1,1,4,4-tetraphenyl butane, 1,3-di(1-lithium-3-methylpentyl)benzene or 1,4-di(1-lithium-3-methylpentyl)benzene. Amount of the organic lithium compounds is generally determined according to the molecular weight of the polymer desired, and is often ranged from 0.05 to 5 wt. % of the total amount of the monomers used.

The reaction temperature for the anionic polymerization may be under a temperature ranging from 0° C. to 150° C. If the reaction temperature is below 0° C., the organic solvents may be frozen, and separation phenomenon may be occurred. If the reaction temperature is above 150° C., polymers may decompose and thus degrade their properties. Therefore, the reaction temperature is preferably ranged from about 20° C. to 120° C.

In the embodiments of the present invention, small amount of antioxidants can be added into the polymer solutions of the conjugated diene-vinyl aromatic hydrocarbon copolymers, such that the polymers can be preserved but not affecting their physical properties. Suitable antioxidants may comprise, for example, hindered phenolic antioxidants and derivatives thereof, phosphite antioxidants and derivatives thereof, or any combination thereof.

Polymers can be separated from the polymer solutions of each block copolymers or the blended polymer solution of the conjugated diene-vinyl aromatic hydrocarbon copolymers by addition of a polar solvent. The polar solvent can be an unfavorable solvent for the conjugated diene-vinyl aromatic hydrocarbon copolymers, such as methanol or acetone. Besides, solvents in the polymer solutions of the block copolymers or the blended polymer solution can also be removed by stirring in hot water or by direct heating, so as to separate the polymers.

In another embodiment, the mixture of conjugated diene-vinyl aromatic hydrocarbon copolymers can be formed by a solid phase blending method. In the solid phase blending method, different solid-phase or melt of the conjugated diene-vinyl aromatic hydrocarbon copolymers are first prepared by melting or blending in plactic or rubber processing equipments. Then, particles of the mixture of conjugated diene-vinyl aromatic hydrocarbon copolymers are obtained by extrusion granulation.

Blending temperature may be of about 100 to 250° C., which can be adjusted according to the softening point of the block copolymers. For example, the blending temperature of polystyrene-polybutadiene-polystyrene tri-block copolymer may be of about 100 to 230° C., and preferably of about 130 to 200° C.

The mixture of conjugated diene-vinyl aromatic hydrocarbon copolymers according to the embodiment of the present invention is a high value thermoplastic elastomer (TPE), which can be used for plastic modification or adhesive properties improvement.

Another embodiment of the present invention provides an adhesive composition comprising the afore-mentioned mixture of conjugated diene-vinyl aromatic hydrocarbon copolymers, and the adhesive composition can be used to prepare an adhesive with improved properties of initial tack, peel strength and holding power. In one embodiment, the adhesive composition may comprise 100 parts by weight of the mixture of conjugated diene-vinyl aromatic hydrocarbon copolymers, and 1 to 700 parts by weight of a tackifier (corresponding to 100 parts by weight of the mixture of conjugated diene-vinyl aromatic hydrocarbon copolymers).

In one embodiment, the tackifier may comprise those showed excellent compatibility with the vinyl aromatic hydrocarbon block polymers, for example, coumarone-indene resin, poly-indene resin, polystyrene resin, poly(methyl indene) resin, alpha-methylstyrene resin, vinyltoluene-alpha-methylstyrene resin, or any combination thereof, and so on.

In another embodiment, the tackifier may comprise those showed excellent compatibility with the conjugated diene block polymers, for example, C5 hydrocarbon resins, hydrogenated C5 hydrocarbon resins, C9 aromatic hydrocarbon resins, C5/C9 resins, styrenated-terpene resins, fully hydrogenated or partially hydrogenated C9 hydrocarbon resins, fully hydrogenated or partially hydrogenated polyterpene, poly(pinene terpene resin), rosin esters, rosin derivatives or any combination thereof.

In further another embodiment, the adhesive composition may comprise a tackifier showed excellent compatibility with the vinyl aromatic hydrocarbon block polymers, and further comprise a tackifier showed excellent compatibility with the conjugated diene block polymers.

Besides, the adhesive composition according to the embodiments of the present invention may further comprise 1 to 500 parts by weight of process oil (corresponding to 100 parts by weight of the conjugated diene-vinyl aromatic hydrocarbon copolymers), for improving adhesive viscosity and processability. In one embodiment, the process oil may comprise, for example, naphthenic oil, paraffinic oil, aromatic oil, natural oil, derivatives thereof, and so on. However, the present invention is not limited thereto.

In addition, the adhesive composition may further comprise other additives, such as plasticizers and so on, according to actual needs.

The objects, features and advantages of the present invention may be better understood by reference to the specific embodiments thereinafter. However, the detailed description of the specific embodiments is not intended to limit the present invention, and the scope of the present invention is defined by appended claims.

COMPARATIVE EXAMPLE 1

Preparation of Polymer a of
Polystyrene-Polybutadiene Block Copolymer by
Coupling Method 1860 grams of cyclohexane (with 120ppm THF) solvent was added into a 5-liter autoclave and heated to 55° C. 100 grams of styrene monomers and 9.74 grams of 5wt.% n-butyl lithium were added sequentially to start polymerization. While the styrene monomers were almost completely reacted, 210 grams of butadiene monomers were added to continue polymerization until the butadiene monomers were almost completely reacted. 5.0 grams of 8.74 wt.% dimethyldichlorosilane was added to proceed a coupling reaction and obtain a polymer solution when the coupling reaction was almost competed. 0.7 phr (part per hundred rubber) of antioxidant (mixture of phosphite series Irgafos 126 and phenolic series Irganox 1076 antioxidants) was added to this polymer solution and then this polymer solution was well blended by stirring.

The polymer solution was slowly added to stirred hot water for removing the solvent in order to obtain an aqueous solution containing solid-state polymer crumbs. The polymer crumbs were filtered out and dried under 100° C. hot air to obtain particles of Polymer A of the polystyrene-polybutadiene block copolymers. Polymer A of the polystyrene-polybutadiene block copolymers had a coupling rate of about 85%, a weight-average molecular weight of about $11.8 \times 10^4$ g/mol., and a polystyrene content of about 29 wt. %.

In examples of the present invention, the weight-average molecular weight was measured by preparing a solution through a way of dissolving 0.02 grams of dried polymer particles in 10 ml of tetrahydrofuran (THF), and injecting 70 μl of this solution into Gel Permeation Chromatography (Waters Pump 515, RI Detector—2414, Shodex Column)

COMPARATIVE EXAMPLE 2

Preparation of Polymer B of
Polystyrene-Polybutadiene Block Copolymer by
Continuous Polymerization Method A polymer solution of polystyrene-polybutadiene-polystyrene block copolymer 2a was prepared as follows. 1885 grams of cyclohexane (with 120ppm THF) solvent was added into a 5-liter autoclave and heated to 58° C. 44.5 grams of styrene monomers and 2.85 grams of 15wt.% n-butyl lithium were added sequentially to start polymerization. While the styrene monomers were almost completely reacted, 218 grams of butadiene monomers were added to continue polymerization until the butadiene monomers were almost completely reacted. 44.5grams of styrene monomers were then added to continue reaction until they were almost completely reacted. The reaction was terminated by adding 1.27grams of water. Then, 0.7 phr of antioxidant (mixture of phosphite series Irgafos 126 and phenolic series Irganox1076antioxidants) was added following by well stirring, and thus the polymer solution of the polystyrene - polybutadiene - polystyrene block copolymer2a was obtained.

A polymer solution of polystyrene-polybutadiene block copolymer 2b was prepared as follows. 1885 grams of cyclohexane (with 120ppm THF) solvent was added into a 5-liter autoclave and heated to 58° C. 89.0 grams of styrene monomers and 4.2 grams of 15 wt.% n-butyl lithium were added sequentially to start polymerization. While the styrene monomers were almost completely reacted, 218grams of butadiene monomers were added to continue polymerization until the butadiene monomers were almost completely reacted. The reaction was terminated by adding 1.27 grams of water. 0.7 phr of antioxidant (mixture of phosphite series Irgafos 126 and phenolic series Irganox 1076 antioxidants) was added following by well stirring, and thus the polymer solution of the polystyrene - polybutadiene block copolymer 2b was obtained.

The polymer solutions of the block copolymers 2a and 2b were blended in the proportion of 82.3 to 17.7 by total solid weight, followed by adding the blended polymer solution into stirred hot water for solvent removal in order to obtain an aqueous solution containing solid-state polymer crumbs. The polymer crumbs were filtered out and dried under 100° C. hot air to obtain particles of Polymer B of the polystyrene-polybutadiene block copolymers. The Polymer B of the polystyrene-polybutadiene block copolymers had a weight-average molecular weight of about $11.3 \times 10^4$ g/mol., and a polystyrene content of about 29 wt. %.

Preparation of Polymer Solutions of Polystyrene-Polybutadiene Di-Block Copolymer SB-1, polystyrene-polybutadiene tapered block copolymer SB-2 and polystyrene-polybutadiene-polystyrene tri-block copolymer SBS by anionic polymerization method.

A polymer solution of polystyrene-polybutadiene di-block copolymer SB-1 was prepared as follows. 1885 grams of cyclohexane (with 120ppm THF) solvent was added into a 5-liter autoclave and heated to 55° C. 116.7 grams of styrene monomers and 3.2 grams of 15 wt.% n-butyl lithium were added sequentially to start polymerization. While the styrene monomers were almost completely reacted, 190 grams of butadiene monomers were added to continue polymerization until the butadiene monomers were almost completely reacted. The reaction was terminated by adding 1.7 grams of water. After stirring for 20 minutes, 0.7 phr of antioxidant (mixture of phosphite series Irgafos 126 and phenolic series Irganox 1076antioxidants) was added following by well stirring, and thus the polymer solution of the polystyrene - polybutadiene di-block copolymer SB-1 was obtained. The polystyrene - polybutadiene di-block copolymer SB-1 had a weight-average molecular weight of about 68000 g/mol., and a polystyrene content of about 37.5wt.%.

A polymer solution of polystyrene-polybutadiene tapered block copolymer SB-2 was prepared as follows. 1885 grams of cyclohexane (with 120ppm THF) solvent was added into a 5-liter autoclave and heated to 55° C. 91.2 grams of styrene monomers and 4.0 grams of 15 wt.% n-butyl lithium were added sequentially to start polymerization. While the styrene monomers were almost completely reacted, 181.1 grams of butadiene monomers were added to continue polymerization, and then 33.8 grams of styrene monomers were added to continue reaction at the time when the reaction temperature was under 65 to 70° C. While the reaction was almost done, 2.0 grams of water was then added to terminate the reaction. After stirring for 20 minutes, 0.7 phr of antioxidant (mixture of phosphite series Irgafos 126 and phenolic series Irganox 1076 antioxidants) was added following by well stirring, and thus the polymer solution of the polystyrene - polybutadiene tapered block copolymer SB-2 was obtained. The polystyrene-polybutadiene tapered block copolymer SB-2 had a weight-average molecular weight of about 68000 g/mol., and a polystyrene content of about 40.5 wt.%.

A polymer solution of polystyrene-polybutadiene-polystyrene tri-block copolymer SBS was prepared as follows. 1885 grams of cyclohexane (with 120ppm THF) solvent was added into a 5-liter autoclave and heated to 55° C. 50.7 grams of styrene monomers and 2.59 grams of 15 wt.% n-butyl lithium were added sequentially to start polymerization. While the styrene monomers were almost completely reacted, 205.7 grams of butadiene monomers were added to continue polymerization and keep the reaction for 10 minutes at the highest reaction temperature, such that the butadiene monomers were almost completely reacted. 50.7 grams of styrene monomers were added to continue polymerization such that the styrene monomers were almost completely reacted. The reaction was then terminated by adding 1.3 grams of water. After stirring for 20 minutes, 0.7 phr of antioxidant (mixture of phosphite series Irgafos 126 and phenolic series Irganox 1076 antioxidants) was added following by well stirring, and thus the polymer solution of the polystyrene-polybutadiene-polystyrene tri-block copolymer SBS was obtained. The polystyrene-polybutadiene-polystyrene tri-block copolymer SBS had a weight-average molecular weight of about 127000 g/mol., and a polystyrene content of about 33.0 wt.%.

COMPARATIVE EXAMPLE 3

Preparation of Polymer C of
Polystyrene-Polybutadiene Block Copolymer

The polymer solutions of the polystyrene-polybutadiene di-block copolymer SB-1 and the polystyrene-polybutadiene-polystyrene tri-block copolymer SBS were well blended in the proportion of 65 to 35 by total solid weight to obtain a blended polymer solution. The blended polymer solution was added into stirred hot water, so as to remove the solvent and obtain an aqueous solution containing solid-state polymer crumbs. The polymer crumbs were filtered out and dried under 100° C. hot air to obtain particles of Polymer C of the polystyrene-polybutadiene block copolymers.

COMPARATIVE EXAMPLE 4

Preparation of Polymer D of
Polystyrene-Polybutadiene Block Copolymer

The polymer solutions of the polystyrene-polybutadiene tapered block copolymer SB-2 and the polystyrene-polybutadiene-polystyrene tri-block copolymer SBS were well blended under room temperature for 60 minutes and in the proportion of 65 to 35 by total solid weight to obtain a blended polymer solution. The blended polymer solution was added into stirred hot water so as to remove the solvent and obtain an aqueous solution containing solid-state polymer crumbs. The polymer crumbs were filtered out and dried under 100° C. hot air to obtain particles of Polymer D of the polystyrene-polybutadiene block copolymers.

EXAMPLE 1

Preparation of Polymer E of
Polystyrene-Polybutadiene Block Copolymer

The polymer solutions of the polystyrene-polybutadiene di-block copolymer SB-1, the polystyrene-polybutadiene tapered block copolymer SB-2 and the polystyrene-polybutadiene-polystyrene tri-block copolymer SBS were well blended for 60 minutes in the proportion of 35/28/37 by total solid weight to obtain a blended polymer solution. The blended polymer solution was added into stirred hot water so as to remove the solvent and obtain an aqueous solution containing solid-state polymer crumbs. The polymer crumbs were filtered out and dried under 100° C. hot air to obtain particles of Polymer E of the polystyrene-polybutadiene block copolymers.

EXAMPLE 2

Preparation of Polymer F of
Polystyrene-Polybutadiene Block Copolymer

The preparation of Polymer F was the same as that for Polymer E, but the blended polymer solution was formed by blending the polymer solutions of the polystyrene-polybutadiene di-block copolymer SB-1, the polystyrene-polybutadiene tapered block copolymer SB-2 and the polystyrene-polybutadiene-polystyrene tri-block copolymer SBS in the proportion of 40/23/37 by total solid weight.

EXAMPLE 3

Preparation of Polymer G of
Polystyrene-Polybutadiene Block Copolymer

The preparation of Polymer G was the same as that for Polymer E, but the blended polymer solution was formed by blending the polymer solutions of the polystyrene-polybutadiene di-block copolymer SB-1, the polystyrene-polybutadiene tapered block copolymer SB-2 and the polystyrene-polybutadiene-polystyrene tri-block copolymer SBS in the proportion of 30/33/37 by total solid weight.

EXAMPLE 4

Preparation of Polymer H of
Polystyrene-Polybutadiene Block Copolymer

Preparation of polymer solutions of polystyrene-polybutadiene di-block copolymer SB-1(H), polystyrene-polybutadiene tapered block copolymer SB-2(H) and polystyrene-polybutadiene-polystyrene tri-block copolymer SBS(H) by anionic polymerization method.

A polymer solution of polystyrene-polybutadiene di-block copolymer SB-1(H) was prepared as follows. 1885 grams of cyclohexane (with 120ppm THF) solvent was added into a 5-liter autoclave and heated to 55° C. 92.1 grams of styrene monomers and 7.2 grams of 15 wt.% n-butyl lithium were added sequentially to start polymerization. While the styrene monomers were almost completely reacted, 215 grams of butadiene monomers were added to continue polymerization until the butadiene monomers were almost completely reacted. The reaction was then terminated by adding 1.7 grams of water. After stirring for 20minutes, 0.7 phr of anti-oxidant (mixture of phosphite series Irgafos 126 and phenolic series Irganox 1076 antioxidants) was added following by well stirring, and thus the polymer solution of the polystyrene-polybutadiene di-block copolymer SB-1(H) was obtained. The polystyrene-polybutadiene di-block copolymer SB-1(H) had a weight-average molecular weight of about 30000 g/mol., and a polystyrene content of about 30 wt.%.

A polymer solution of polystyrene-polybutadiene tapered block copolymer SB 2(H) was prepared as follows. 1885 grams of cyclohexane (with 120ppm THF) solvent was added into a 5-liter autoclave and heated to 55° C. 67.2 grams of styrene monomers and 7.2 grams of 15 wt.% n-butyl lithium were added sequentially to start polymerization. While the styrene monomers were almost completely reacted, 215 grams of butadiene monomers were added to continue polymerization, and then 24.9 grams of styrene monomers were added to continue reaction during the reaction temperature was under 65 to 70C. While the reaction was almost done, 2.0 grams of water was then added to terminate the reaction. After stirring for 20 minutes, 0.7 phr of antioxidant (mixture of phosphite series Irgafos 126 and phenolic series Irganox 1076 antioxidants) was added following by well stirring, and thus the polymer solution of the polystyrene - polybutadiene tapered block copolymer SB-2(H) was obtained. The polystyrene - polybutadiene tapered block copolymer SB-2(H) had a weight-average molecular weight of about 30000 g/mol., and a polystyrene content of about 30 wt.%.

A polymer solution of polystyrene-polybutadiene-polystyrene tri-block copolymer SBS(H) was prepared as follows. 1885 grams of cyclohexane (with 12ppm THF) solvent was added into a 5-liter autoclave and heated to 55° C. 46.1grams of styrene monomers and 3.5 grams of 15 wt.% n-butyl lithium were added sequentially to start polymerization. While the styrene monomers were almost completely reacted, 218 grams of butadiene monomers were added to continue polymerization and keep reaction for 10 minutes at the highest reaction temperature, such that the butadiene monomers were almost completely reacted. 46.1 grams of styrene monomer were added to continue polymerization and keep the reaction for 10 minutes at the highest reaction temperature, such that the styrene were almost completely reacted. The reaction was then terminated by adding 1.3grams of water. After stirring for 20 minutes, 0.7 phr of antioxidant (mixture of phosphite series Irgafos 126 and phenolic series Irganox 1076 antioxidants) was added following by well stirring, and thus the polymer solution of the polystyrene - polybutadiene-polystyrene tri-block copolymer SBS(H) was obtained. The polystyrene-polybutadiene-polystyrene tri-block copolymer SBS(H) had a weight-average molecular weight of about 60000 g/mol., and a polystyrene content of about 30 wt.%.

The polystyrene-polybutadiene di-block copolymer SB-1 (H), the polystyrene-polybutadiene tapered block copolymer SB-2(H) and the polystyrene-polybutadiene-polystyrene tri-block copolymer SBS(H) all had a polystyrene content of about 30 wt. %.

The polymer solutions of the polystyrene-polybutadiene di-block copolymer SB-1(H), the polystyrene-polybutadiene tapered block copolymer SB-2(H) and the polystyrene-polybutadiene-polystyrene tri-block copolymer SBS(H) were blended for 60 minutes and in the proportion of 10/10/80 by total solid weight to obtain a blended polymer solution. The blended polymer solution was added into stirred hot water so as to remove the solvent and obtain an aqueous solution containing solid-state polymer crumbs. The polymer crumbs were filtered out and dried under 100° C. hot air to obtain particles of Polymer H of the polystyrene-polybutadiene block copolymers.

Basic Physical Property Test for Polymers A~H.

The dried particles of Polymers A~H of the polystyrene-polybutadiene block copolymers were milled by heated roller and pressed and molded into sheets with 2 mm thickness by a heated press, and then the sheets were cut into dumbbell-shaped specimens with a dumbbell cutter #3. The elongation property of the dumbbell-shaped specimens were tested according to ASTM D 412 (crosshead speed: 500 mm/min.) under a temperature of 25° C. and a relative humidity of 65% by Instron tensile tester. The results were shown in Table 1.

Preparation of Adhesive Compositions from Polymers A~H and Property Tests of Adhesives 100 grams of the dried particles selected from the Polymers A~H of the polystyrene-polybutadiene block copolymers were blended with 120 grams of P 100 and 60 grams of S-125 tackifiers (P 100 belongs to fully hydrogenated polyterpene resin series, and S-125 belongs to poly(pinene terpene resin) series, both available from Idemitsu Petrochemical Co., Ltd), 85 grams of Semi-paraffinic oil (available from South Korea S-Oil Corporation), and 1 gram of antioxidant Irganox-1076 (available from Ciba Geigy Corporation), so as to obtain adhesive compositions. Each adhesive composition was blended at a rotational speed of 150 rpm and at a temperature of 180° C. for 2 hours to prepare a hot melt adhesive.

The hot melt adhesive was coated on an OPP film (Coater roller gap of 0.208 mm) to form a tape under a temperature of 208° F. by Hot melt Coater (Cheminstruments-HLCL 1000). For the tape, initial tack test was conducted by initial tack tester (Chatillon DFM 10) in accordance with PSTC-16, peel strength test was conducted by peel strength tester (Instron 4464) in accordance with PSTC-101, and holding power at a temperature of 60° C. was tested by holding power tester (Cheminstruments RT-10) in accordance with PSTC-107. The results were shown in Table 1.

TABLE 1

| | Polymer | | | | | | | |
|---|---|---|---|---|---|---|---|---|
| | A | B | C | D | E | F | G | H |
| SB-1:SB-2:SBS (by total solid weight) | | | | | 35:28:37 | 40:23:37 | 30:33:37 | |
| SB-1(H):SB-2(H):SBS(H) (by total solid weight) | | | | | | | | 10:10:80 |
| Elongation rate (%) | 962 | 1075 | 770 | 966 | 1150 | 1113 | 1114 | 1050 |
| Adhesive | | | | | | | | |
| Initial Tack (Newton) | 3.7 | 5.4 | 8.1 | 7.2 | 13.5 | 12.8 | 13.7 | 10.2 |
| Peel Strength (Kgf/2.54 cm) | 0.52 | 0.59 | 1.8 | 0.7 | 2.4 | 2.5 | 2.1 | 2.1 |
| 60° C. Holding Power (min.) | 1.0 | 6.5 | 5.9 | 5.1 | 8.6 | 9.8 | 7.5 | 11.5 |

As shown in Table 1, Polymers E, F, G and H, which comprised the polystyrene-polybutadiene di-block copolymer SB-1/SB-1(H), the polystyrene-polybutadiene tapered block copolymer SB-2/SB-2(H) and the polystyrene-polybutadiene-polystyrene tri-block copolymer SBS/SBS(H), were all provided with improved elongation property suitable for plastic modification.

Besides, as shown in Table 1, the adhesive of Polymer A prepared by coupling method showed inferior initial tack property. The adhesive formed by Polymer B including the polystyrene-polybutadiene-polystyrene block copolymer 2a and the polystyrene-polybutadiene-polystyrene block copolymer 2b, the adhesive formed by Polymer C including the polystyrene-polybutadiene di-block copolymer SB-1 and the polystyrene-polybutadiene-polystyrene tri-block copolymer SBS, or the adhesive formed by Polymer D including the polystyrene-polybutadiene tapered block copolymer SB-2 and the polystyrene-polybutadiene-polystyrene tri-block copolymer SBS also showed inferior initial tack property.

Table 1 illustrated that the adhesives formed by Polymers E, F and G, which were prepared by blending the polystyrene-polybutadiene di-block copolymer SB-1, the polystyrene-polybutadiene tapered di-block copolymer SB-2 and the polystyrene-polybutadiene-polystyrene tri-block copolymer SBS in different proportions, showed improved initial tack property. Furthermore, for Polymer H, although it was comprised of the polystyrene-polybutadiene di-block copolymer SB-1(H), the polystyrene-polybutadiene tapered di-block copolymer SB-2(H) and the polystyrene-polybutadiene-polystyrene tri-block copolymer SBS(H) each having a weight-average molecular weight and a vinyl aromatic hydrocarbon content different than those of Polymers E, F and G, and the copolymers SB-1(H), SB-2(H) and SBS(H) were blended in a proportion different from that for Polymers E, F and G, the adhesive comprising Polymer H also showed improved initial tack property.

Therefore, as shown in table 1, the adhesive compositions blended with Polymers E, F, G and H according to the examples of the present invention can be provided for improving initial tack, peel strength and holding power properties of the adhesives, and further to promote the application of the adhesives.

Although specific embodiments have been illustrated and described, it will be clear to the person skilled in the art that changes and modifications may be made without departing from the scope of the invention. As such, that which is set forth in the following description is offered by way of illustration only and not as a limitation. The actual scope of the invention is intended to be defined by the following claims, along with the full range of equivalents to which such claims are entitled.

The invention claimed is:

1. A mixture of conjugated diene-vinyl aromatic hydrocarbon copolymers, comprising:
   10 to 45 wt. % of a non-tapered di-block copolymer;
   10 to 45 wt. % of a tapered di-block copolymer; and
   10 to 80 wt. % of a non-tapered multi-block copolymer constituted of three or more blocks, wherein each of the non-tapered di-block copolymer, the tapered di-block copolymer and the non-tapered multi-block copolymer are polymerized from conjugated diene monomers and vinyl aromatic hydrocarbon monomers, wherein the wt. percentages are based on the total weight of the non-tapered di-block copolymer, the tapered di-block copolymer and the non-tapered multi-block copolymer.

2. The mixture of conjugated diene-vinyl aromatic hydrocarbon copolymers of claim 1, wherein the conjugated diene monomers are selected from a group consisting of 1,3-butadiene, 2,3-dimethyl-1,3-butadiene, 3-butyl-1,3-octadiene, isoprene, trans-1,3-pentadiene, 2-phenyl-1,3-butadiene and combinations thereof.

3. The mixture of conjugated diene-vinyl aromatic hydrocarbon copolymers of claim 1, wherein the vinyl aromatic hydrocarbon monomers are selected from a group consisting of styrene, α-methyl styrene, p-ethyl styrene, cyclohexyl styrene, p-methyl styrene, o-methyl styrene, m-methyl styrene, 1-vinyl-5-hexyl naphthalene, vinyl naphthalene and combinations thereof.

4. The mixture of conjugated diene-vinyl aromatic hydrocarbon copolymers of claim 1, wherein the mixture of conjugated diene-vinyl aromatic hydrocarbon copolymers has a weight-average molecular weight of $2\times10^4$ to $20\times10^4$ g/mol.

5. The mixture of conjugated diene-vinyl aromatic hydrocarbon copolymers of claim 1, wherein the non-tapered di-block copolymer has a weight-average molecular weight of $2\times10^4$ to $10\times10^4$ g/mol.

6. The mixture of conjugated diene-vinyl aromatic hydrocarbon copolymers of claim 1, wherein the tapered di-block copolymer has a weight-average molecular weight of $2\times10^4$ to $10\times10^4$ g/mol.

7. The mixture of conjugated diene-vinyl aromatic hydrocarbon copolymers of claim 1, wherein the non-tapered multi-block copolymer has a weight-average molecular weight of $5\times10^4$ to $20\times10^4$ g/mol.

8. The mixture of conjugated diene-vinyl aromatic hydrocarbon copolymers of claim 1, wherein the non-tapered di-block copolymer has a weight-average molecular weight of $2\times10^4$ to $10\times10^4$ g/mol., the tapered di-block copolymer has a weight-average molecular weight of $2\times10^4$ to $10\times10^4$ g/mol., and the non-tapered multi-block copolymer has a weight-average molecular weight of $5\times10^4$ to $20\times10^4$ g/mol.

9. The mixture of conjugated diene-vinyl aromatic hydrocarbon copolymers of claim 1, wherein the non-tapered di-block copolymer has a vinyl aromatic hydrocarbon content of about 25 to 50 wt. %.

10. The mixture of conjugated diene-vinyl aromatic hydrocarbon copolymers of claim 1, wherein the tapered di-block copolymer has a vinyl aromatic hydrocarbon content of about 25 to 55 wt. %.

11. The mixture of conjugated diene-vinyl aromatic hydrocarbon copolymers of claim 1, wherein the non-tapered multi-block copolymer has a vinyl aromatic hydrocarbon content of about 25 to 50 wt. %.

12. The mixture of conjugated diene-vinyl aromatic hydrocarbon copolymers of claim 1, wherein the non-tapered di-block copolymer has a vinyl aromatic hydrocarbon content of about 25 to 50 wt. %, the tapered di-block copolymer has a vinyl aromatic hydrocarbon content of about 25 to 55 wt. %, and the non-tapered multi-block copolymer has a vinyl aromatic hydrocarbon content of about 25 to 50 wt. %.

13. The mixture of conjugated diene-vinyl aromatic hydrocarbon copolymers of claim 8, wherein the non-tapered di-block copolymer has a vinyl aromatic hydrocarbon content of about 25 to 50 wt. %, the tapered di-block copolymer has a vinyl aromatic hydrocarbon content of about 25 to 55 wt. %, and the non-tapered multi-block copolymer has a vinyl aromatic hydrocarbon content of about 25 to 50 wt. %.

14. The mixture of conjugated diene-vinyl aromatic hydrocarbon copolymers of claim 1, wherein an end portion of the tapered di-block copolymer is predominantly polymerized from the second vinyl aromatic hydrocarbon monomers.

15. The mixture of conjugated diene-vinyl aromatic hydrocarbon copolymers of claim 1, further comprising an antioxidant.

16. An adhesive composition, comprising:
   100 parts by weight of the mixture of conjugated diene-vinyl aromatic hydrocarbon copolymers according to claims 1; and
   1 to 700 parts by weight of a tackifier.

17. The adhesive composition of claim 16, wherein the tackifier comprises coumarone-indene resin, poly-indene resin, polystyrene resin, poly(methyl indene) resin, alpha-methylstyrene resin, vinyltoluene-alphamethylstyrene resin, or any combination thereof.

18. The adhesive composition of claim 16, wherein the tackifier comprises C5 hydrocarbon resins, hydrogenated C5 hydrocarbon resins, C9 aromatic hydrocarbon resins, C5/C9 resins, styrenated-terpene resins, fully hydrogenated or partially hydrogenated C9 hydrocarbon resins, fully hydrogenated or partially hydrogenated polyterpene, poly(pinene terpene resin), rosin esters, rosin derivatives, or any combination thereof.

19. The adhesive composition of claim 16, further comprising 1 to 500 parts by weight of process oil.

20. The adhesive composition of claim 19, wherein the process oil comprises naphthenic oil, paraffinic oil, aromatic oil, natural oil, derivatives thereof, or any combination thereof.

* * * * *